(12) United States Patent
Zafar et al.

(10) Patent No.: US 11,130,257 B2
(45) Date of Patent: Sep. 28, 2021

(54) LIGNIN-BASED PHENOLIC RESIN

(71) Applicant: Stora Enso OYJ, Helsinki (FI)

(72) Inventors: Ashar Zafar, Årsta (SE); Dimitri Areskogh, Stockholm (SE); Jesper Ekström, Johanneshov (SE)

(73) Assignee: Stora Enso OYJ, Helsinki (FI)

( * ) Notice: Subject to any disclaimer, the term of this patent is extended or adjusted under 35 U.S.C. 154(b) by 71 days.

(21) Appl. No.: 16/316,807

(22) PCT Filed: Jul. 3, 2017

(86) PCT No.: PCT/IB2017/054006
§ 371 (c)(1),
(2) Date: Jan. 10, 2019

(87) PCT Pub. No.: WO2018/011668
PCT Pub. Date: Jan. 18, 2018

(65) Prior Publication Data
US 2019/0152094 A1    May 23, 2019

(30) Foreign Application Priority Data
Jul. 11, 2016 (SE) .................................. 1651025-7

(51) Int. Cl.
| | | |
|---|---|---|
| *B27N 3/00* | (2006.01) | |
| *B27N 3/02* | (2006.01) | |
| *C09J 161/06* | (2006.01) | |
| *C08G 8/38* | (2006.01) | |
| *B27N 3/14* | (2006.01) | |
| *C07G 1/00* | (2011.01) | |
| *C09J 197/00* | (2006.01) | |
| *C08H 7/00* | (2011.01) | |
| *C08L 97/00* | (2006.01) | |
| *C09D 7/40* | (2018.01) | |
| *C09D 161/34* | (2006.01) | |

(52) U.S. Cl.
CPC .............. *B27N 3/002* (2013.01); *B27N 3/02* (2013.01); *B27N 3/14* (2013.01); *B27N 3/143* (2013.01); *C07G 1/00* (2013.01); *C08G 8/38* (2013.01); *C08H 6/00* (2013.01); *C08L 97/005* (2013.01); *C09D 7/70* (2018.01); *C09D 161/34* (2013.01); *C09J 161/06* (2013.01); *C09J 197/005* (2013.01)

(58) Field of Classification Search
CPC .... C09J 161/06; C09J 197/005; C09J 161/34; C09D 161/34; C08H 6/00; C07G 1/00; B27N 3/002; B27N 3/02; B27N 3/14; B27N 3/143; C08L 61/06; C08L 97/005; C08L 97/02; C08L 2666/16; C08G 8/38
USPC .................. 428/292.4; 524/841, 13, 73, 14; 527/403; 525/501; 528/157; 530/500
See application file for complete search history.

(56) References Cited

U.S. PATENT DOCUMENTS

| | | | |
|---|---|---|---|
| 3,210,240 | A | 10/1965 | Read et al. |
| 4,184,914 | A | 1/1980 | Jenkins |
| 4,597,831 | A | 7/1986 | Anderson |
| 6,103,060 | A | 8/2000 | Munerelle et al. |
| 2011/0245381 | A1 | 10/2011 | Winterowd et al. |

FOREIGN PATENT DOCUMENTS

| | | |
|---|---|---|
| CN | 104087219 | 10/2014 |
| CN | 104245799 A | 12/2014 |
| EP | 2993201 | 3/2016 |
| WO | 2006031175 | 3/2006 |
| WO | 2012136894 | 10/2012 |
| WO | 2013144454 A1 | 10/2013 |
| WO | 2015044528 | 4/2015 |
| WO | 2015079107 | 6/2015 |

OTHER PUBLICATIONS

International Searching Authority, Written Opinion of the International Searching Authority, PCT/IB2017/054006, dated Jan. 18, 2018.
International Searching Authority, International Search Report, PCT/IB2017/054006, dated Jan. 18, 2018.
Cetin, N. S. et al., "Studies on Lignin-Based Adhesives for Particleboard Panels," Turk J Agric For, 2003, vol. 27, pp. 183-189; abstract; pp. 183-185.
El Mansouri, N. E. et al., "Lignin-Based Polycondensation Resins for Wood Adhesives," Journal of Applied Polymer Science, 2007, vol. 103, pp. 1690-1699.; abstract; pp. 1690-1691.
English Translation of Office Action for CN 201780042790.1, dated Mar. 19, 2020.
English Translation of Examiner's Comments for CN 201780042790.1, Mar. 19, 2020.

*Primary Examiner* — Camie S Thompson
(74) *Attorney, Agent, or Firm* — Greer, Burns & Crain, Ltd.

(57) ABSTRACT

The present invention relates to a lignin-based phenolic resin, particularly useful in the manufacture of oriented strand boards (OSB).

12 Claims, No Drawings

LIGNIN-BASED PHENOLIC RESIN

This application is a U.S. National Phase under 35 U.S.C. § 371 of International Application No. PCT/IB2017/054006, filed Jul. 3, 2017, which claims priority under 35 U.S.C. §§ 119 and 365 to Swedish Application No. 1651025-7, filed Jul. 11, 2016.

FIELD OF THE INVENTION

The present invention relates to a lignin-based phenolic resin, particularly useful in the manufacture of oriented strand boards (OSB).

BACKGROUND

Oriented strandboard (OSB) is a wood-based product that is commonly used in residential and commercial construction, furniture and other applications. OSB is generally manufactured by cutting strands from round wood, drying the strands, applying wax and bonding resin (binder) to the strands, forming the treated strands into a mat on a continuous line, and then consolidating the mat under heat and pressure for an extended period of time. The latter is accomplished by use of a hot-press. OSB has properties similar to plywood and has a greater load-bearing capacity than milled wood panels. The production cost of OSB is generally lower than the production cost of plywood.

The length axis of the strand is approximately parallel to the grain of the wood. The OSB mat is usually comprised of discrete surface and core layers. The layers of thin wooden chips are created by shredding the wood into strips, which are sifted and then oriented on a belt or wire cauls. The mat is made in a forming line. Wood strips on the external layers are generally aligned to the panel's strength axis, while internal layers are often perpendicular. The number of layers placed is determined partly by the thickness of the panel but is limited by the equipment installed at the manufacturing site. Individual layers can also vary in thickness to give different finished panel thicknesses. Strands in the surface layer are larger on average than the strands used in the core layer.

In general there are three different types of bonding resin used to make OSB. These are liquid phenol/formaldehyde resole resins (LPF), powdered phenol/formaldehyde resole resins (PPF), and polymeric diphenylmethane diisocyanate (PMDI). It is also common to use a combination of bonding resins when manufacturing OSB.

A resole resin is a resin made under base-catalyzed conditions with formaldehyde to phenol ratio of more than one to produce highly methylolated structures.

Each of these different binder types has its own performance attributes and limitations. LPF resins are relatively low in cost, but may develop bond strength more slowly than PMDI and are less tolerant to high moisture levels in the wood. PPF resins develop bond strength relatively quickly and are more tolerant to high moisture content levels, but are more expensive than an LPF resin and application rates are limited to about 3% of the wood mass. PMDI tends to develop bond strength quickly and the ultimate bond strength values tend to be greater than that associated with an equivalent level of LPF or PPF. However, PMDI is relatively expensive and often does not work well on dry strands. PMDI has an additional limitation related to its tendency to bond to the press platen.

Liquid bonding resins for OSB have a number of performance and application requirements. A second requirement of bonding resins for OSB relates to a need for minimal contribution to the emission of volatile chemicals both internally and externally to an OSB mill. Common chemicals emitted from a PF resin during the process of mat consolidation at elevated temperature include phenol, methanol and formaldehyde. Ammonia is also routinely emitted from PF bonding resins used in OSB applications. The ammonia is generated by the hydrolysis of urea, which can be promoted by alkaline and high-temperature conditions.

Most liquid PF resins used for OSB contain urea at substantial levels. Urea is incorporated into the resin for the purpose of viscosity reduction and the consumption of free-formaldehyde. Urea is well suited for these functions by virtue of its reactivity, solubility, low molecular weight, low-cost, availability, and favorable toxicity profile. It is common for urea levels in liquid PF resins for use in OSB to be as high as 15-40% based on the solids content of the resin. Thus, liquid PF resins for use in OSB are different from PF resins that are used in other wood bonding applications.

OSB mills in many countries are regulated for the amount of phenol, methanol, formaldehyde and other organic compounds that are emitted from the mill into the surrounding environment. Emission of ammonia external to the mill may also be regulated. However, ammonia present in the waste air stream from the plant can be converted to NOx in reactive thermal oxidizers that are commonly installed in the air exhaust system prior to the stack. There are limitations in the amount of NOx that can be emitted from OSB mills in many countries.

Additionally, ammonia is a poisonous gas and there are frequently ammonia emissions inside the mill near the blenders, forming line and press area. The ammonia inside the mill could pose a risk to workers inside the mill if the concentration exceeds a given threshold. Thus, there is a need to reduce ammonia emissions originating from liquid PF resins in OSB mills.

A further requirement of bonding resins for OSB is that they provide high strand-to-strand bond strength with minimal cure time in the press at a low cost. Binder costs typically represent a substantial portion of the total cost to produce OSB. Thus, there is a need for a PF resin that provides high bond strength with minimal cure time at a low cost. The higher cost and price volatility of PF resin is mainly associated with phenol being used in the synthesis of PF resins. Lignin is a suitable aromatic compound for the replacement of phenol in phenolic resin.

Native lignin is a high-molecular-weight phenylpropane polymer that is present in wood at a level of about 24-35% in softwood and 17-25% in hardwood. Native lignin in wood is not soluble in water and one of its functions in the plant is to bond the cellulose fibers (wood cells) together. In the commercial kraft pulping process wood chips are steeped in aqueous solutions of sodium sulfide and sodium hydroxide at elevated temperatures in order to degrade the native lignin to the point of being soluble in water. This allows for isolation of the high-value wood fibers.

The residual aqueous solution of degraded lignin, sodium carbonate and sodium sulfate is commonly referred to as "black liquor". Usually, the black liquor also contains various carbohydrates. Conventional black liquor has a pH value of about 13-14. The degraded lignin present in black liquor can be isolated in discreet fractions by addition of acids to lower the pH value. As the pH level is decreased, there is initial precipitation of the highest molecular weight lignin compounds. These can be separated from the residual liquor by filtration. A further reduction in the pH value results in precipitation of more lignin compounds, which have lower molecular weight than the first fraction. This second set of precipitated compounds can also be isolated by filtration. This process can be conducted multiple times to yield an array of fractions.

Acids suitable for this process include strong acids such as sulfuric acid, nitric acid, and hydrochloric acid; or weak acids such as acetic acid or carbonic acid. The latter is achieved by injecting carbon dioxide into the black liquor.

Some compounds in whole black liquor or whole spent sulfite liquor can have deleterious effects on the performance of a phenolic binder resin for an OSB application. Also, spent sulfite liquors contain lignosulfonate, as opposed to kraft lignin, which is mostly free of sulfonic acid groups. The sulfonic acid groups in the lignosulfonate salts, which are present in binders that are partially comprised of sulfite liquors, can adversely affect the performance of the OSB when it is exposed to water.

U.S. Pat. No. 8,445,563 discloses a phenol-formaldehyde resin comprising 5 to 20% of lignin (by weight of the solids used).

There is thus a need for a phenol-formaldehyde-urea resin that fulfils the requirements for being used in OSB, yet minimizes the issues described above related to urea, phenol and formaldehyde.

SUMMARY OF THE INVENTION

It has now surprisingly been found that it is possible to manufacture phenol-formaldehyde-urea and phenol-formaldehyde resins with a higher amount of lignin, yet the resin fulfils the requirements for being used in OSB. Since the amount of lignin used is higher, the disadvantages associated with urea, phenol and formaldehyde are at least partly avoided.

Preferably the lignin is an alkaline lignin generated in e.g. the Kraft process. The lignin may then be separated from the black liquor by using the process disclosed in WO2006031175. In one embodiment of the invention, the lignin used is produced by the "LignoBoost" process.

It has been found that the lignin can replace both phenol (30-70%) and urea (40-100%) in the phenol formaldehyde urea resin and also reduce the consumption of formaldehyde by 15-25%.

The present invention is thus directed to an aqueous bonding resin having 35-75% solid content, the aqueous bonding resin being a mixture of the product of a reaction among phenol and formaldehyde, a group 1 alkaline metal hydroxide, lignin and optionally urea, wherein the phenol and formaldehyde is 40 to 80% of the weight of the solids provided to the reaction; the group 1 alkaline metal hydroxide is 5 to 20% of the weight of the solids provided to the reaction; the lignin is 21.0 to 35% of the weight of the solids provided to the reaction; and the urea is 0 to 30% of the weight of the solids provided to the reaction.

The present invention is also directed to an engineered wood product manufactured using said aqueous bonding resin. In one embodiment, said engineered wood product is an OSB.

DETAILED DESCRIPTION

One embodiment of the present invention is thus directed to an aqueous bonding resin having 35-75% solid content, the aqueous bonding resin being a product of a reaction among phenol and formaldehyde, a group 1 alkaline metal hydroxide, lignin and optionally urea, wherein the phenol and formaldehyde is 40 to 80% of the weight of the solids provided to the reaction; the group 1 alkaline metal hydroxide being 5 to 20% of the weight of the solids provided to the reaction; the lignin being 21.0 to 35% of the weight of the solids provided to the reaction; and the urea being 0 to 30% of the weight of the solids provided to the reaction.

In one embodiment, the lignin is 21.0 to 30% of the weight of the solids provided to the reaction. In one embodiment, the lignin is 25 to 35% of the weight of the solids provided to the reaction such as 30 to 35% of the weight of the solids provided to the reaction. In one embodiment, the lignin is 25 to 30% of the weight of the solids provided to the reaction.

The amount of urea is preferably 0.1 to 30% of the weight of the solids provided to the reaction, such as 1 to 30% of the weight of the solids provided to the reaction, preferably 5 to 25% of the weight of the solids provided to the reaction, more preferably 5 to 15% of the weight of the solids provided to the reaction.

It is intended throughout the present description that the expression "lignin" embraces any kind of lignin, e.g. lignin originated from hardwood, softwood or annular plants. In one embodiment, the lignin is a kraft liquor degraded lignin. Preferably the lignin is an alkaline lignin generated in e.g. the Kraft process. The lignin may then be separated from the black liquor by using the process disclosed in WO2006031175.

The resin is made by reacting formaldehyde and phenol at a molar ratio of 1.5-3.5 moles of formaldehyde to one mole of phenol in the presence of lignin, water and a group 1 alkaline metal hydroxide at a temperature of 60-100° C. for a period of time sufficient to achieve a viscosity of 200-5,000 cps. The formaldehyde, water, group 1 alkaline metal hydroxide, phenol and lignin may be combined in a number of ways. They may all be added together in a single charge or several discrete charges. The formaldehyde, water and group 1 alkaline metal hydroxide may be added to a reactor along with the phenol and lignin prior to initiating the reaction during the first stage of this process, or the formaldehyde, water and group 1 alkaline metal hydroxide might be added in multiple discreet aliquots to the phenol and lignin during this first stage. This first stage of resin synthesis is the polymerization stage, when the phenol and formaldehyde are reacted together to form a polymeric material.

In a second stage of the synthesis process the mixture is cooled to a temperature of less than 60° C., and optionally urea, and optionally water and a group 1 alkaline metal hydroxide, are added with stirring to form the final resin binder composition. The viscosity of the composition is 50-1000 cps.

Phenolic resin made using lignin has advantages over existing OSB binder technologies. These advantages include reduced ammonia emissions, improved shelf life and lower cost without loss of board properties, including internal bond strength.

Phenol/formaldehyde adducts associated with this invention are formed by the reaction of phenol and formaldehyde in the presence of lignin and a group 1 alkaline metal hydroxide in an essentially aqueous medium. In one embodiment the formaldehyde/phenol molar ratio is 2.0-3.0 moles of formaldehyde to one mole of phenol. The formaldehyde reactant can exist as either a formalin solution or decomposable formaldehyde products such as paraformaldehyde or trioxane. In the event that formalin is used the solution concentration can generally be as high as about 50%.

Levels of the different components are selected to achieve a composition in the final resin corresponding to phenol/formaldehyde adduct and an alkaline metal salt or alkaline metal salts of the phenol-formaldehyde adduct (40-85% of the total weight of the solids in the resin), urea (0-35% of the total weight of the solids in the resin), and lignin and an alkaline metal salt or alkaline metal salts of the lignin (5-25% of the total weight of the solids in the resin). The term 'phenol/formaldehyde adduct' simply means reaction product of phenol and formaldehyde. Adducts of phenol and formaldehyde could include relatively small compounds such as methylolated phenol or larger molecules that are products of the condensation of methylolated phenol. The urea and, optionally, some portion of the caustic and water are added subsequent to polymerization of the phenol and formaldehyde reaction mixture.

Examples of group 1 alkaline metal hydroxides suitable for this invention include sodium hydroxide, potassium hydroxide, lithium hydroxide, rubidium hydroxide, cesium hydroxide, and francium hydroxide. Other alkaline materials such as sodium carbonate and potassium carbonate can also be used in place of or in addition to the group 1 alkaline metal hydroxide for the purpose of this invention. There would be residuals of the carbonates in the resin. These could include bicarbonates.

The lignin can be obtained from the substance commonly known as 'black liquor'. The black liquor can be derived from wood chips, including those based on softwood or hardwoods. Softwoods can include pines (loblolly, lodge pole, slash, pitch, *ponderosa*, shortleaf, yellow, white, jack and red), fir (Douglas, Frazier, white, balsam, Pacific silver, sub alpine), cedar (Alaskan, Northern white, Eastern red, Western red, incense, Port Orford), spruce (red, white, black, englemann, Sitka), hemlock (Eastern, Western, Mountain, larch) and others. Hardwoods can include oak (white, red, bur, live), poplar (yellow, balsam, quaking aspen, big tooth), maple (sugar, silver, red), basswood, birch, alder, beech, gum, cherry, cypress, elm, hack berry, hickory, *sassafras*, sycamore, cucumber, walnut, locust and others.

The black liquor is formed by steeping wood chips in solutions of sodium sulfide and sodium hydroxide at elevated temperatures for a period of time and subsequent removal of the cellulosic fibers. The residual liquor is dark in color due to the presence of degraded lignin. The term 'black liquor' is a consequence of this dark color. The process used to generate the black liquor is generally known as the kraft pulping process. The lignin may then be separated from the black liquor by using the process disclosed in WO2006031175. In one embodiment, the lignin is produced using the "LignoBoost" process.

The resins are used to manufacture the surface layers of an oriented strand board panel or article. The method is to coat the particles or strands with a wax and mix the particles or strands with the resin so that the particles or strands will be adhered together in the final article. The particles or strands are then laid up into the article and cured under heat and pressure to form the article.

A typical oriented strand board has surface layers and core layers. The wood strands are typically 25-45 mm thick, 10-60 cm wide, and 0.1-2 m long. The strands are sprayed or otherwise treated with a slack wax and a resin, either a core layer resin for the core layer strands or a surface layer resin such as the present resin for the surface layer strands. The core and surface layer strands are then laid up on a caul plate and screen into a mat having outer surface layers and inner core layers. The strands in the surface layers are usually aligned along one major axis and the strands in the core layers are aligned along the other major axis.

The mat, caul plate and screen are placed in a hot press and heated and pressed to form a composite OSB panel. The surface temperature of the press platens usually is between 200 and 220° C.; the initial pressure on the mat is about 500-2200 psi; and the time in the press is around 2-5 minutes depending on the thickness of the panel. There is a first phase in which the mat is compressed to its target thickness, a second phase in which the mat is maintained at its target thickness, and a third phase in which the press is opened and all external pressure on the consolidated mat is relieved. A mat is typically compressed from around 7-15 cm thickness to a desired thickness such as 1.5-2.5 cm.

Commercial OSB panels are usually hot at the time that they are stacked into bundles. In this configuration the elevated temperature of the OSB can persist for several days and it is common for this prolonged heat-treatment to affect some of the properties of the OSB. During this process the resin will change. The water will be removed from the resin and phenol-formaldehyde adducts will condense into larger molecules. It is possible, but not known, that some of the lignin might react with phenol-formaldehyde adducts. The pH of the wood/resin mixture is about 5.5 to 7 and at this pH level most of the phenol-formaldehyde adducts and lignin material are insoluble. During the hot-pressing process a portion of the phenol-formaldehyde adducts are converted into load-bearing solids, which effectively transfer stress between adjacent strands.

EXAMPLES

Example 1

Lignin-phenol-formaldehyde resin for OSB panel was cooked in a 5 L glass reactor and mixed with pitched blade stirrer. Firstly, 633.4 g of lignin (95% lignin), 950.1 g of molten phenol, 824 g of water and 1.71 litres of 37% formaldehyde solution were added to the glass reactor and mixed.

Secondly, 250 ml of NaOH solution (45%) was added slowly to prevent excessive heat development and giving a pH of 10.2-10.5. The temperature was kept constant at 60° C. for 60 minutes and was then increased to 85° C. The viscosity was measured at 25° C. using a Höppler viscometer. When the viscosity had increased to app. 350-400 mPas the jacket temperature was set to 60° C. When the reaction temperature had decreased to ≤75° C., 250 ml of 45% w/w sodium hydroxide was slowly added keeping the reaction temperature below 75° C. The jacket temperature was then adjusted to 74° C. and the increase in viscosity followed as before. When the desired viscosity was obtained, the reaction was stopped by cooling to ambient temperature as fast as possible. The lignin content in the final resin was 24% by weight of the solids used.

Example 2

Reference phenol formaldehyde (PF) resin for OSB panel was cooked in a 5 L glass reactor and mixed with pitched blade stirrer. Firstly, 956 g of molten phenol, 915 ml of water and 1.46 litre of 37% formaldehyde solution were added to the glass reactor and mixed.

Secondly, 196 ml of NaOH solution (45%) was added slowly to prevent excessive heat development and giving a pH of 10.2-10.5. The temperature was kept constant at 60° C. for 30 minutes and was then increased to 85° C. The viscosity was measured at 25° C. using a Höppler viscometer. When the viscosity had increased to app. 350-400 mPas the jacket temperature was set to 60° C. and water (64 ml) was added. When the reaction temperature had decreased to ≤75° C., 131 ml of 45% w/w sodium hydroxide was slowly added keeping the reaction temperature below 75° C. The jacket temperature was then adjusted to 75° C. and the reaction followed as before. When the desired viscosity was obtained, the reaction was stopped by cooling to ambient temperature as fast as possible.

Example 3

Spruce boards were cut into 190 mm long pieces and strands were manufactured in a disk flaker and sieved. The impregnation of the wood strands was performed in a rotating drum batch using the resin from Example 1 or 2 which was diluted with water to reach a specific viscosity. The impregnated OSB strands were spread and hot-pressed at 160° C. for a total pressing time of 10 min to achieve boards measuring 540×540 mm². After hot-pressing, the boards were cooled between two aluminium plates at room temperature. Prior to evaluation all samples were conditioned at 20° C. and 65% RH. Internal bonding was evaluated before and after cyclic test conditions specified in V313 standard. Average data from 3 boards is presented in Table 1.

TABLE 1

OSB board densities, internal bond and residual strength after conditioning and aging according to V313 standard.

| OSB Panel | Density (Kg/m3) Average | After conditioning (20° C., 65% RH) Internal Bond (MPa) Average | After aging according to V313 standard Internal Bond (MPa) AVERAGE |
|---|---|---|---|
| Board based on resin from Example 1 | | | |
| LPF resin based OSB | 621 | 0.62 | 0.43 |
| Board based on resin from Example 2 | | | |
| Ref. PF resin based OSB | 627 | 0.51 | 0.51 |

In view of the above detailed description of the present invention, other modifications and variations will become apparent to those skilled in the art. However, it should be apparent that such other modifications and variations may be effected without departing from the spirit and scope of the invention.

Example 4

Lignin based phenolic resin was synthesized for OSB applications. In the first step, lignin solution was prepared by mixing of 433 g of kraft lignin (solid content 95%), 635 g of water and 204 g of 50% sodium hydroxide solution in a 5 liter glass reactor equipped with overhead stirrer, condenser and temperature control unit. Lignin solution was continuously stirred for 90 minutes.

In the second step, 320 g of phenol and 835 g of formalin (concentration 52.5%) were added to the lignin solution. The temperature was increased to 80° C. The reaction was monitored by measuring the viscosity using the Brookfield DV-II+LV viscometer. The reaction mixture was continuously heated at the temperature at 80° C. and 36 g of 50% sodium hydroxide solution was added after 45 minutes of reaction, followed by addition of 100 g of phenol and 15 g of water after 95 minutes. The reaction was cooled down to 45° C. after minutes, then 380 g of urea was added and the reaction was cooled down to room temperature.

The resin was analyzed and the results of the analysis are given in Table 2.

TABLE 2

| Resin Properties | |
|---|---|
| S.C (%) | 59.8 |
| pH | 10.5 |
| Gel time (min) @100° C. | 25 |

Example 5

Spruce boards were cut into 190 mm long pieces and strands were manufactured in a disk flaker and sieved. The impregnation of the wood strands was performed in a rotating drum batch using the resin from Example 4 (which was diluted with water to reach a specific viscosity) for surface layer and pMDI for the core layer. The strands had a moisture content of 4%. The ratio between surface layer and core layer was 3:2, and 8% resin was used for the surface layer and 4% for the core layer.

The impregnated OSB strands were spread and hot-pressed at 215° C. for a total pressing time of 3 minutes and 40 seconds to achieve boards measuring 540×540 mm².

After hot-pressing, the boards were cooled between two aluminium plates at room temperature. Prior to evaluation all samples were conditioned at 20° C. and 65% RH. Internal bonding was evaluated after cyclic test conditions specified in V313 standard. Average data from 2 boards is presented in Table 3.

TABLE 3

OSB board densities, internal bond and residual strength after aging according to V313 standard.

| OSB Panel | Density (Kg/m3) Average | After aging according to V313 standard Internal Bond (MPa) AVERAGE |
|---|---|---|
| LPF resin based OSB | 640 | 0.24 |

The invention claimed is:

1. An aqueous bonding resin having 35-75% solid content, the aqueous bonding resin being a product of a reaction among phenol and formaldehyde, the aqueous bonding resin comprising a group 1 alkaline metal hydroxide and lignin, wherein the phenol and formaldehyde is 40 to 80% of the weight of the solids provided to the reaction; the group 1 alkaline metal hydroxide is 5 to 20% of the weight of the solids provided to the reaction; and the lignin is 21.0 to 35% of the weight of the solids provided to the reaction.

2. An aqueous bonding resin according to claim 1, wherein the lignin is 25 to 35% of the weight of the solids provided to the reaction.

3. An aqueous bonding resin according to claim 2, wherein the lignin is 25 to 30% of the weight of the solids provided to the reaction.

4. An aqueous bonding resin according to claim 1, wherein the lignin has been generated in the Kraft process.

5. An engineered wood product manufactured using the aqueous bonding resin of claim 1.

6. An engineered wood product according to claim 5, wherein said product is an oriented strand board.

7. A method for manufacturing an oriented strand board product wherein the surface layers of an oriented strand board panel or article are treated by coating particles or strands with a wax and mixing the particles or strands with the resin of claim 1, so that the particles or strands will be adhered together; followed by curing under heat and pressure to form the product.

8. An aqueous bonding resin according to claim 1, further comprising urea, wherein the urea is no more than 30% of the weight of the solids provided to the reaction.

9. An aqueous bonding resin according to claim 8, wherein the amount of urea is 5 to 25% of the weight of the solids provided to the reaction.

10. An aqueous bonding resin according to claim 9, wherein the amount of urea is 5 to 15% of the weight of the solids provided to the reaction.

11. An aqueous bonding resin according to claim 1, further comprising urea, wherein the lignin is 25 to 35% of the weight of the solids provided to the reaction, and wherein the urea is 5 to 25% of the weight of the solids provided to the reaction.

12. An aqueous bonding resin according to claim 1, further comprising urea, wherein the lignin is 25 to 30% of the weight of the solids provided to the reaction, and wherein the urea is 5 to 15% of the weight of the solids provided to the reaction.

* * * * *